Aug. 11, 1964

O. C. NORTON 3,143,933

CYLINDER AND SEALING RING COMBINATION

Filed Dec. 3, 1962

INVENTOR.
ORLO CLAIR NORTON

BY Charles L. Lovercheck
atty

Aug. 11, 1964   O. C. NORTON   3,143,933
CYLINDER AND SEALING RING COMBINATION
Filed Dec. 3, 1962   2 Sheets-Sheet 2

INVENTOR.
ORLO CLAIR NORTON
BY

United States Patent Office 3,143,933
Patented Aug. 11, 1964

3,143,933
CYLINDER AND SEALING RING COMBINATION
Orlo Clair Norton, Erie, Pa., assignor to Norton Engineering, Inc., Erie, Pa., a corporation of Pennsylvania
Filed Dec. 3, 1962, Ser. No. 241,870
5 Claims. (Cl. 92—85)

This invention relates to air cylinders and, more particularly, to an improved type of cylinder in combination with a piston and piston ring.

There is an industrial need for a simple, efficient piston and piston ring which will be economical and yet efficient in operation.

It is, accordingly, an object of the present invention to provide an improved piston and piston ring.

Another object of the invention is to provide an improved piston and piston ring wherein the piston ring is disposed in a tapered groove.

A further object of the invention is to provide an improved ring type shaft seal for a piston rod.

Yet a further object of the invention is to provide a piston, cylinder, and piston ring which are simple in construction, economical to manufacture, and simple and efficient to use.

With the above and other objects in view, the present invention consists of the combination and arrangement of parts hereinafter more fully described, illustrated in the accompanying drawings and more particularly pointed out in the appended claims, it being understood that changes may be made in the form, size, proportions, and minor details of construction without departing from the spirit or sacrificing any of the advantages of the invention.

Figure 1:
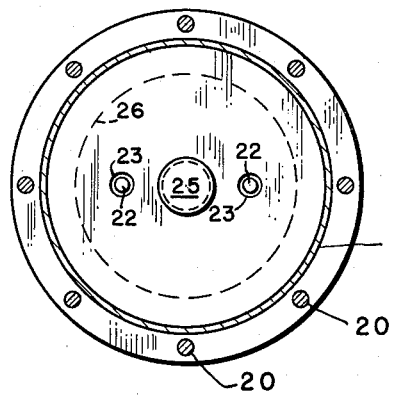
FIG. 1 is a cross sectional view taken on line 1—1 of FIG. 2.
Figure 2:
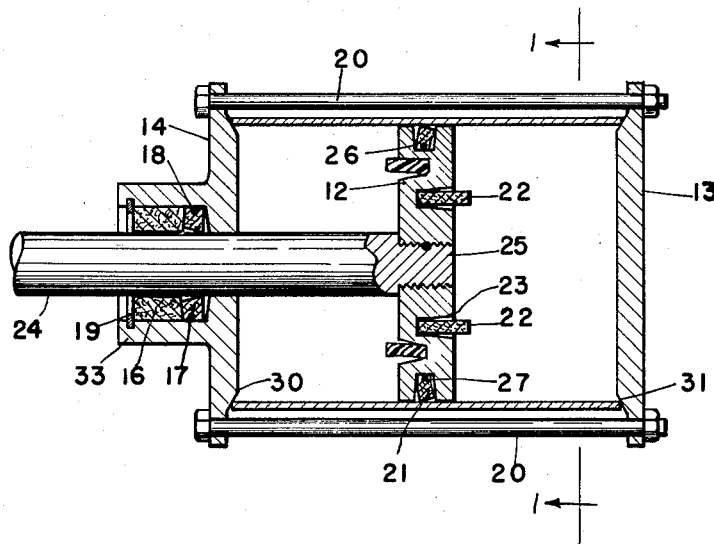
FIG. 2 is a longitudinal cross sectional view of the cylinder and piston shown in FIG. 1.

Now with more particular reference to the drawings, FIGS. 1 and 2 show a cylinder 11 having a piston 12 reciprocably mounted thereon. The cylinder 11 has a cylinder head 13 and a cylinder base head 14. The cylinder head 13 is thicker at the center and the thick center part joins the thin rim at offset tapered surfaces 30 and 31 on the head 14 and the head 13, respectively. The ends of the cylinder 11 rest on these tapered surfaces and form a seal therewith. The heads are urged together to sandwich the cylinder wall therebetween by bolts 20 which hold the two heads together and sandwich the cylinder therebetween.

The piston 12 has a peripheral groove 26 which receives a piston ring 21. The piston ring 21 is generally square in cross section with a flat outside peripheral surface and an inner peripheral ring 27 which is thin in cross section. The groove 26 is generally wedge shaped; that is, the groove tapers inwardly approximately ten degrees so that the piston ring 21 can rock about the inner ring 27 as the piston 12 reciprocates.

The piston 12 has spaced openings 23 in the side thereof adjacent the head 13 and these openings 23 receive resilient annular plug members 22. These members may be round, square, annular or of other shape in cross section. The resilient members 22 are considerably longer than the depth of the openings 23 and are of lesser lateral dimensions. Thus, the resilient members extend out beyond the surface. When the piston comes in close relation with the head 13, the resilient members 22 will be compressed into the openings 23.

The openings 23 are generally tapered outwardly toward each end. When the resilient members 22 are removed from the openings 23, the openings can be engaged by a spanner wrench to unthread the piston 12 from a threaded portion 25 of a rod 24.

The head 14 has a boss 33 thereon and the boss has a counterbore therein which receives a packing ring 17. The packing ring 17 has a reduced diameter ring 18 attached to its outer periphery. This ring 18 forms a support for the ring 17 to rock on. The ring 18 rests on the inner surface of the counterbore as the piston 12 reciprocates. Therefore, a trailing edge of the ring 17 engages the piston rod and will not scrape any oil therefrom as the rod reciprocates.

A bushing 16 which may be a fiber bushing is disposed in the counter bore and the bushing is held in place by a snap ring 19 which is disposed in an inner peripheral groove in the counterbore.

Figure 3:
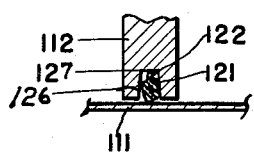
FIG. 3 is a partial cross sectional view of another embodiment of the invention.

The embodiment of the invention in FIG. 3 shows a partial view of a piston 112 having a ring 121 similar to the ring 21 in FIG. 2. This piston ring is supported in a tapered groove 126 which is generally wedge shaped in cross section. Since the outer part of the ring is not as wide as the groove which receives it, the ring will move in the groove and the leading corner thereof will incline relative to the axis of the piston so that the trailing corner does not scrape the inner wall of a cylinder 111 as the piston 112 reciprocates. The piston ring 121 has an inner reduced portion 122 which forms a rocking surface for the ring.

Figure 4:
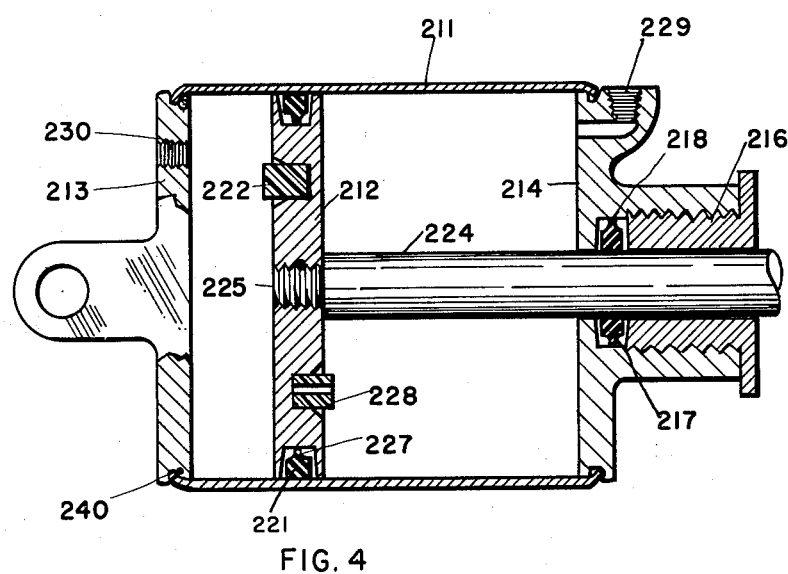
FIG. 4 is a longitudinal cross sectional view of another embodiment of the piston and cylinder according to the invention.

In the embodiment of the invention shown in FIG. 4, a cylinder 211 is disclosed having a piston 212 reciprocably mounted therein and attached to a piston rod 224. The piston is attached to the rod 224 by means of a reduced size threaded portion 225.

A head 213 is disposed at one end and a head 214 is disposed at the other end of the cylinder. The head 214 has an internally threaded counterbored boss 216 therein with a generally cylindrical bushing member threadably received therein. The bushing member forms one side of the tapered wall for a packing ring 217 which has an outside reduced thickness portion 218 about which the packing ring 217 can rock. The packing ring is considerably smaller in cross section than the groove in which it is received so that it will rock in the groove and not allow the leading corner edges of the rings to scrape the cylinder walls as the piston rod 224 slides in and out since the leading side of the ring will be inclined relative to the cylinder wall and will therefore tend to ride over the film of oil on the inside of the cylinder wall.

Threaded inlet openings 229 and 230 are provided in opposite ends on the cylinder 211 to which sources of fluid can be attached.

The heads 213 and 214 each have a circumferential groove 240 therein. The heads snugly fit into the cylinder 211 and the ends of the cylinder are pressed or peened into the groove. Thus, the cylinder may be quickly and economically assembled.

The circumference of the piston is fitted with the synthetic resilient piston ring indicated at 21, 121, and 221 in the several embodiments. The ring in each embodiment is square or rectangular in cross section and of larger diameter than the cylinder bore. Thus, the ring exerts a pressure against the cylinder wall, forming an effective seal therewith.

The inner rings or lips 27, 127, and 227 may be integrally fixed to the insides of the piston rings. Since the piston rings can rock on the lips 27, 127, and 227, this will increase the wall pressure between the corners of the piston ring and the inside of the cylinder wall.

The piston rod is sealed in the head through which it passes in a manner similar to the piston ring except that the internal diameter of the ring is less than the piston rod diameter and the lip is reversed; that is, it is on the outside of the ring. The rod bushing may be screwed into the counterbore on the head or pressed in and retained by screws. The holes in the head are for the tubular or solid resilient plugs 22 and these plugs or tubes form a cushion and prevent the piston from striking the head at the end of its stroke. When these plugs are removed, the holes from which they are removed may be engaged by a spanner wrench to aid in assembling or disassembling the piston from the rod.

The foregoing specification sets forth the invention in its preferred practical forms but the structure shown is capable of modification within a range of equivalents without departing from the invention which is to be understood is broadly novel as is commensurate with the appended claims.

The embodiments of the invention in which an exclusive property or privilege is claimed are defined as follows:

1. A cylinder and piston combination comprising
a cylinder barrel,
a piston reciprocably supported in said cylinder barrel,
rod means attached to one side of said piston,
a head on said barrel,
recesses in said piston defining openings,
resilient members between said head and said piston in said recesses and attached to said piston,
said resilient members extending out of said recesses toward said head,
said recesses being larger in lateral dimension than said resilient members,
said piston being adapted to come into proximate relation with said head,
said recesses having a volume which will substantially accommodate the entire volume of said resilient members whereby said resilient members will be distorted into said recesses when said piston comes into proximate relation with said head.

2. The cylinder and piston combination recited in claim 1 wherein
said cylinder has a second head
and said rod means extends through said second head,
second recesses formed in said piston on the side adjacent said second head generally similar to said recesses formed on said first head,
resilient members in said second recesses,
said second recesses being adapted to substantially accommodate said second resilient members.

3. The combination recited in claim 1 wherein
said head has a portion extending into said cylinder barrel,
a circumferential groove in said head,
the material of said cylinder barrel being distorted into said groove whereby said head is secured to said cylinder barrel.

4. The combination recited in claim 2 wherein
each said head has a portion received in said cylinder barrel,
a circumferential groove in each said head,
the material of said sylinder barrel being distorted into said grooves whereby said heads are secured to said cylinder barrel.

5. A cylinder assembly comprising, in combination,
a cylinder barrel,
a piston reciprocably supported in said cylinder barrel,
rod means attached to one side of said piston,
a head on said barrel,
recesses in said cylinder assembly defining openings,
resilient members having a part thereof disposed between said head and said piston and a part of said resilient members disposed in said recesses and attached to said assembly,
said recesses being larger in lateral dimension than said resilient members,
said piston being adapted to come into proximate relation with said head,
said recesses having a volume which will substantially accommodate the entire volume of said resilient members whereby said resilient members will be distorted into said recesses when said piston comes into proximate relation with said head.

References Cited in the file of this patent

UNITED STATES PATENTS

| | | |
|---|---|---|
| 1,092,464 | Watson et al. | Apr. 7, 1914 |
| 1,306,601 | McCarren | June 10, 1919 |
| 1,834,219 | Oishei et al. | Dec. 1, 1931 |
| 1,843,852 | Troy | Feb. 2, 1932 |
| 2,349,840 | Babbitt | May 30, 1944 |
| 2,429,426 | Phillips et al. | Oct. 21, 1947 |
| 2,509,672 | Christensen | May 30, 1950 |
| 2,533,531 | Stephens | Dec. 12, 1950 |
| 2,607,644 | Smith et al. | Aug. 19, 1952 |
| 2,678,072 | Verderber | May 11, 1954 |
| 2,815,004 | Droman | Dec. 3, 1957 |
| 2,931,673 | Gondek | Apr. 5, 1960 |
| 3,057,630 | Sneed | Oct. 9, 1962 |
| 3,094,043 | Powers et al. | June 18, 1963 |